United States Patent
Manternach et al.

(10) Patent No.: US 12,139,203 B2
(45) Date of Patent: Nov. 12, 2024

(54) SUSPENSION SYSTEM FOR A WORK VEHICLE

(71) Applicant: DEERE & COMPANY, Moline, IL (US)

(72) Inventors: Byron N. Manternach, Dunkerton, IA (US); Scott A. Tebbe, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 285 days.

(21) Appl. No.: 17/937,494

(22) Filed: Oct. 3, 2022

(65) Prior Publication Data

US 2024/0109606 A1    Apr. 4, 2024

(51) Int. Cl.
*B62D 33/06* (2006.01)
*F16F 9/53* (2006.01)

(52) U.S. Cl.
CPC ......... *B62D 33/0608* (2013.01); *F16F 9/535* (2013.01); *F16F 2222/12* (2013.01); *F16F 2228/066* (2013.01); *F16F 2230/0047* (2013.01); *F16F 2230/18* (2013.01)

(58) Field of Classification Search
CPC .. B62D 33/0608; F16F 9/535; F16F 2222/12; F16F 2228/066; F16F 2230/0047; F16F 2230/18
See application file for complete search history.

(56) References Cited

U.S. PATENT DOCUMENTS

| | | | |
|---|---|---|---|
| 5,579,229 A | 11/1996 | Maguran, Jr. | |
| 6,892,864 B2 | 5/2005 | Iyengar et al. | |
| 6,953,108 B2 | 10/2005 | Anderfaas et al. | |
| 9,038,789 B2* | 5/2015 | West | F16F 1/3615 |
| | | | 188/267.2 |
| 9,527,364 B2* | 12/2016 | Mohamed | B60G 17/019 |

(Continued)

FOREIGN PATENT DOCUMENTS

| | | | |
|---|---|---|---|
| DE | 4003959 A1 | 8/1991 | |
| DE | 102014204900 A1 * | 9/2015 | ......... B60G 17/0165 |

(Continued)

OTHER PUBLICATIONS

Savaia et al., Temperature Estimation in a Magneto-Rheological Damper, IEEE Conference on Control Technology and Applications, Aug. 24, 2020, pp. 567-572.

(Continued)

*Primary Examiner* — George C Jin (57) ABSTRACT

A suspension system for a work vehicle includes a shock absorber including a fluid, a coil positioned at least partially in the fluid, a sensor configured to detect a work status of the work vehicle, and a controller. The controller is configured to determine the work status of parked or operational based on the sensor, determine an electrical resistance of the coil in a shock absorber based on the work status, predict a temperature of a fluid in the shock absorber based on the electrical resistance of the coil, provide an electric current in the coil based on the predicted temperature of the fluid, determine the electrical resistance of the coil while the electric current is on, and terminate the electric current in the coil based on the work status and the predicted temperature.

20 Claims, 4 Drawing Sheets

(56) References Cited

U.S. PATENT DOCUMENTS

| | | | |
|---|---|---|---|
| 10,369,856 B2 | 8/2019 | Rutkowski et al. | |
| 2003/0070892 A1* | 4/2003 | Iyengar | F16F 9/535 188/267.2 |
| 2003/0195683 A1* | 10/2003 | Oakley | B60G 17/0152 701/37 |
| 2004/0195062 A1* | 10/2004 | Anderfaas | F16F 9/535 188/267.2 |
| 2005/0133318 A1* | 6/2005 | Fedders | F16F 9/535 188/267.2 |
| 2014/0244112 A1* | 8/2014 | Dunaway | B60G 13/00 701/37 |

FOREIGN PATENT DOCUMENTS

| | | | | |
|---|---|---|---|---|
| DE | 102016123607 A1 | 6/2017 | | |
| EP | 1557304 A1 * | 7/2005 | ......... | B60G 17/0152 |
| JP | 6369020 B2 | 8/2018 | | |
| KR | 20060038226 A | 5/2006 | | |

OTHER PUBLICATIONS

German Search Report issued in application No. 102023123575.3, dated Feb. 26, 2024, 08 pages.

* cited by examiner

SUSPENSION SYSTEM FOR A WORK VEHICLE

FIELD OF THE DISCLOSURE

The present disclosure relates to a suspension system for a work vehicle.

BACKGROUND

Work vehicles can include suspension systems with shock absorbers or dampers.

SUMMARY

According to an aspect of the present disclosure, a suspension system for a work vehicle includes a shock absorber including a fluid, a coil positioned at least partially in the fluid, a sensor configured to detect a work status of the work vehicle, and a controller. The controller is configured to determine the work status of parked or operational based on the sensor, determine an electrical resistance of the coil in a shock absorber based on the work status, predict a temperature of a fluid in the shock absorber based on the electrical resistance of the coil, provide an electric current in the coil based on the predicted temperature of the fluid, determine the electrical resistance of the coil while the electric current is on, and terminate the electric current in the coil based on the work status and the predicted temperature.

According to an aspect of the present disclosure, the controller is configured to determine the electrical resistance of the coil when the work status is parked.

According to an aspect of the present disclosure, the controller is configured to access a database to predict the temperature of the fluid.

According to an aspect of the present disclosure, the controller is configured to provide the electric current in the coil when the predicted temperature of the fluid is below a lower threshold.

According to an aspect of the present disclosure, the controller is configured to terminate the electric current in the coil when one of the predicted temperature of the fluid is at or above a lower threshold and the work status is operational.

According to an aspect of the present disclosure, the sensor is configured to detect a status of a transmission of the work vehicle.

According to an aspect of the present disclosure, the controller is configured to determine the work status is parked when the sensor detects the transmission is in park.

According to an aspect of the present disclosure, the controller is configured to determine the work status is operational when the sensor detects the transmission is in one of a forward gear and a reverse gear.

According to an aspect of the present disclosure, the controller is configured to provide information regarding the work status, the predicted temperature, and the electric current to one of an operator interface and a remote electronic device.

According to an aspect of the present disclosure, the controller is configured to continuously determine the electrical resistance of the coil and continuously predict the temperature of the fluid based on the electrical resistance of the coil.

According to an aspect of the present disclosure, a method of operating a suspension system for a work vehicle includes detecting via a sensor a work status of the work vehicle, determining via a controller the work status of parked or operational, determining via the controller an electrical resistance of a coil positioned at least partially in a fluid located inside a shock absorber, predicting via the controller a temperature of a fluid in the shock absorber based on the electrical resistance of the coil, providing via the controller an electric current in the coil based on the work status and the predicted temperature of the fluid, determining via the controller the electrical resistance of the coil while the electric current is on, and terminating via the controller the electric current in the coil based on the work status and the predicted temperature.

The above and other features will become apparent from the following detailed description and accompanying drawings.

BRIEF DESCRIPTION OF THE DRAWINGS

The detailed description refers to the accompanying figures in which.

Like reference numerals are used to indicate like elements throughout the several figures.

DETAILED DESCRIPTION

The embodiments or implementations disclosed in the above drawings and the following detailed description are not intended to be exhaustive or to limit the present disclosure to these embodiments or implementations.

Figure 1:
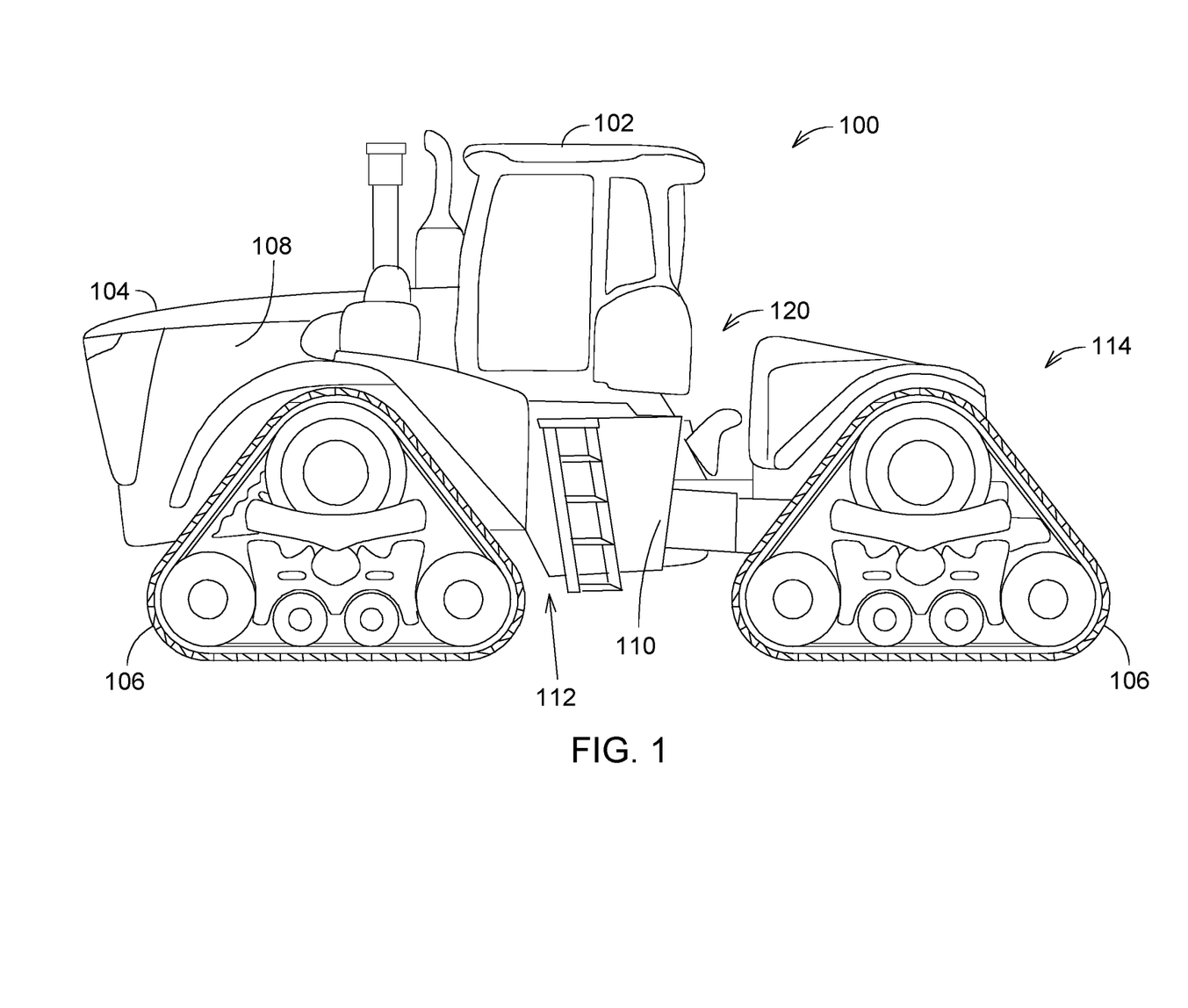
FIG. 1 is a perspective view of a work vehicle including a suspension system, according to an implementation.

FIG. 1 illustrates a work vehicle 100, for example an agricultural tractor. This disclosure also applies to other types of work vehicles in agriculture, construction, forestry, and road building. The work vehicle 100 can include an operator station or cab 102, a hood 104, one or more ground engaging apparatus 106, for example wheels or track assemblies, and a frame or chassis 110. The work vehicle 100 can have a rigid or an articulated frame 110. The work vehicle 100 can include one or more power sources 108, for example an internal combustion engine, a hybrid engine, or an electric or hydraulic motor. The work vehicle 100 can include a transmission 112 transferring power from the one or more power sources 108 to a drivetrain, which includes the ground engaging apparatus 106 and one or more power take off (PTO) shafts 114 or other auxiliary power outputs or inputs. The transmission 112 can include one or more electric or hydraulic machines. The work vehicle 100 can include an operator interface having any number and combination of electronic devices, such as an interactive display for providing and receiving information and instructions to and from an operator. The work vehicle 100 can include a suspension system 120.

Figure 2:
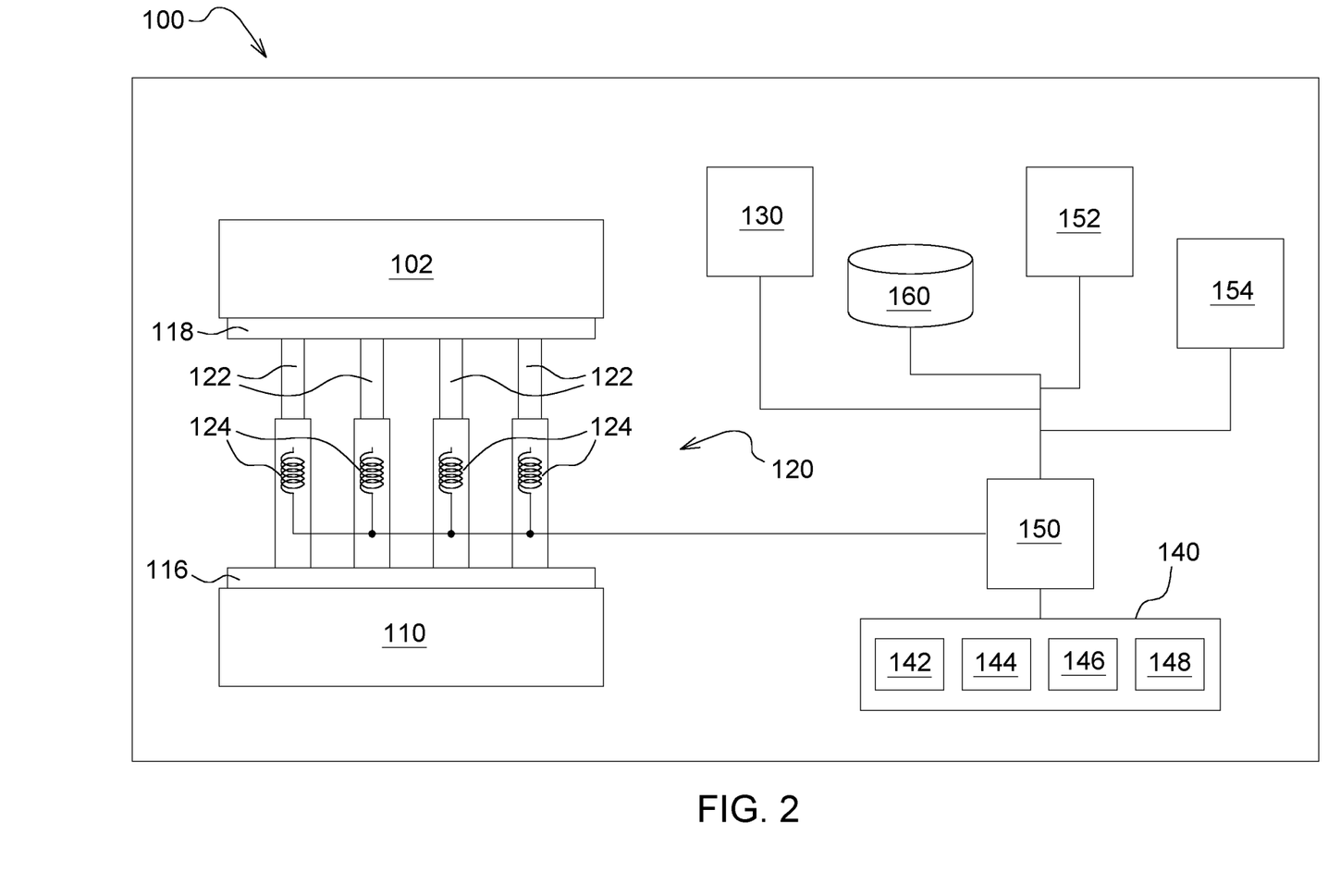
FIG. 2 is a schematic diagram of a suspension system for a work vehicle, according to an implementation.

With reference to FIG. 2, a suspension system 120 is positioned between the operator station 102 and the chassis 110. The suspension system 120 can include springs, dampers, hydraulic or pneumatic cylinders, and other suspension components. The suspension system 120 can be movably or pivotally attached to the operator station 102 and the chassis 110 at multiple locations (e.g., at each corner of the operator station 102). The suspension system 120 can connect directly or indirectly to the operator station 102 or to a frame member 116 connected to the operator station 102. The suspension system 120 can connect directly or indirectly to the chassis 110 or to a frame member 118 connected to the chassis 110. The suspension system 120 allows the operator station 102 to move with in a plurality of directions (e.g., up, down, left, right, forward, backward, pitch, yaw, roll, etc.) relative to the chassis 110. The suspension system 120 can include one or more dampers or shock absorbers 122 positioned between the operator station 102 and the chassis 110. The shock absorber 122 can include a variety of fluids with various viscosities. The shock absorber 122 can include a magnetorheological fluid. The shock absorber 122 extends and retracts based in part on the viscosity of the fluid. The shock absorber 122 can include an electrical conductor coil 124 (e.g., wire coil) positioned at least partially or completely within the fluid. The coil 124 connects to an electrical power source 130, such as a battery or an electrical generator.

An electronic control unit or controller 150 can connect to the coil 124 in the shock absorber 122. The electronic control unit or controller 150 includes a processor and memory. The controller 150 can include digital and analog inputs and outputs. The controller 150 can include a non-transitory, computer readable memory or medium. The controller 150 connects to and communicates with various input and output devices. The controller 150 can connect to and communicate with a variety of sensors, valves, switches, operator interfaces, other electronic control units or controllers, and other electronic devices.

The controller 150 can control the current in the coil 124 to modify the properties of the fluid located inside the shock absorber 122, which varies the suspension of the operator station 102. The controller 150 can vary the current in the coil 124 to modify the viscosity of the fluid in the shock absorber 122. The controller 150 can adjust the current in the coil 124 to increase or decrease the viscosity of the fluid, which increases or decreases the stiffness of the suspension system 120. The controller 150 can adjust the current in each of the coils 124 for the one or more shock absorbers 122 so that the currents are all the same, are all different, or have any variation or combination. The controller 150 can adjust the current in the coil 124 to change the viscosity of the fluid to a desired viscosity. For example, the coil 124 can increase the temperature of the fluid in the shock absorber 122, which decreases the viscosity of the fluid to a desired value or range. This provides or allows for an optimized response of the shock absorber 122.

A sensor system 140 can include one or more sensors positioned at various locations around the work vehicle 100. The sensing system 140 can sense, detect, or measure a work status (e.g., parked or operational) of the work vehicle 100. The sensor system 140 can include one or more sensors 142, 144, 146, 148 to sense, detect, or measure one or more of a parking brake status (e.g., engaged or disengaged), a transmission status (e.g., selected gear or speed), a ground engaging apparatus status (e.g., stationary or moving), and a power source status (e.g., on or off).

The controller 150 connects to and communicates with the sensor system 140. The controller 150 determines a work status of the work vehicle 100 based upon the one or more sensors 142, 144, 146, 148 of the sensor system 140. The work status of the work vehicle 100 can include a parked status (e.g., the transmission is in park, or the work vehicle is stationary) or an operational status (e.g., the transmission is in a forward or reverse gear, or the work vehicle is moving). The controller 150 can provide the work status to one or more of a local or remote operator interface 152 and a local or remote electronic device 154 (e.g., server, computer, smartphone, tablet, etc.) for informing or notifying a local or remote operator of the work vehicle 100.

The controller 150 determines an electrical resistance of the coil 124 in the shock absorber 122 when the work machine 100 is in the parked status. The controller 150 can determine the electrical resistance of the coil 124 by various apparatus and methods. The electrical resistance can be determined by measuring the current and voltage drop across the coil 124.

The controller 150 can predict a temperature of the fluid in the shock absorber 122 based upon the electrical resistance of the coil 124 in the shock absorber 122. The controller 150 can access a database 160 to predict a temperature of the fluid in the shock absorber 122 based upon the electrical resistance of the coil 124 in the shock absorber 122. The database 160 can include lookup or reference table with electric resistances and corresponding predicted temperatures for the coil 124. The database 160 can include a local database, a remote database, or both. The controller 150 can provide the predicted temperature to one or more of the operator interface 152 and any other electronic device 154 for display or notification.

When the predicted temperature of the fluid is below a lower threshold, the controller 150 provides an electric current in the coil 124, which heats the fluid in the shock absorber 122. The lower threshold can be a preselected minimum operating temperature of the fluid. The controller 150 can provide a constant or varying current in the coil 124. The controller 150 can determine an estimated amount of time for the temperature of the fluid to reach or exceed the lower threshold. The controller 150 can provide the estimated amount of time to one or more of the operator interface 152 and any other electronic device 154 for display or notification.

The controller 150 determines or monitors the electrical resistance in the coil 124 as the predicted temperature of the coil 124 increases due to the electric current. The controller 150 can repeatedly or continuously determine the electrical resistance in the coil 124 and repeatedly or continuously predict the temperature during the warmup or heating process. The controller 150 can update the estimated amount of time for the temperature of the fluid to reach or exceed the lower threshold as the predicted temperature increases. The controller 150 can provide the updated estimates to one or more of the operator interface 152 and any other electronic device 154 for display or notification.

When the predicted temperature of the fluid is at or above lower threshold, the controller 150 terminates the current in the coil 124. For example, the controller 150 can terminate the current in the coil 124 when the predicted temperature of the fluid is at the lower threshold or at a preselected amount above the lower threshold. The controller 150 can signal or inform one or more of the operator interface 152 and any other electronic device 154 when the fluid is at or above the lower threshold. Either or both the operator interface 152 and any other electronic device 154 can communicate this information to the operator via visual notification, audio notification, or both.

If at any time the work status of the work vehicle 100 changes from parked to operational, the controller 150 can terminate the current in the coil 124 regardless of the predicted temperature of the fluid. The controller 150 can signal or inform one or more the operator interface 152 and any other electronic device 154 when the warmup or heating process is interrupted. Either or both the operator interface 152 and any other electronic device 154 can communicate this information to the operator via visual notification, audio notification, or both. If the work status of the work vehicle 100 returns to the parked status from the operational status, the controller 150 can determine whether the temperature of the fluid in the shock absorber 122 is at or above the lower threshold.

Alternatively, or additionally, the controller 150 can repeatedly or continuously determine or monitor the electrical resistance of the coil 124 in the shock absorber 122 when the work vehicle 100 is in either or both the parked status and the operational status. The controller 150 can send data to one or more of the operator interface 152 and any other electronic device 154, which can provide information to an operator regarding one or more of the predicted temperature of the fluid in the shock absorbers 122, predicted performance of the suspension system 120 based on the predicted temperature of the fluid in the shock absorbers 122, and recommended actions to improve the predicted performance of the suspension system 120. For example, the controller 150 can recommend the operator return the work vehicle 100 to the parked status until the predicted temperature of the fluid in the shock absorbers 122 is at or above the lower threshold. The controller 150 can provide an estimated amount of time for the predicted temperature of the fluid to reach the lower threshold if the work vehicle 100 remains in the operational status. The controller 150 can provide an estimated amount of time for the predicted temperature of the fluid to reach the lower threshold if the work vehicle 100 is returned to the parked status. The controller 150 can provide any of this information to one or more of the operator interface 152 and any other electronic device 154, which can communicate any of this information to the operator via visual notification, audio notification, or both.

Figure 3:
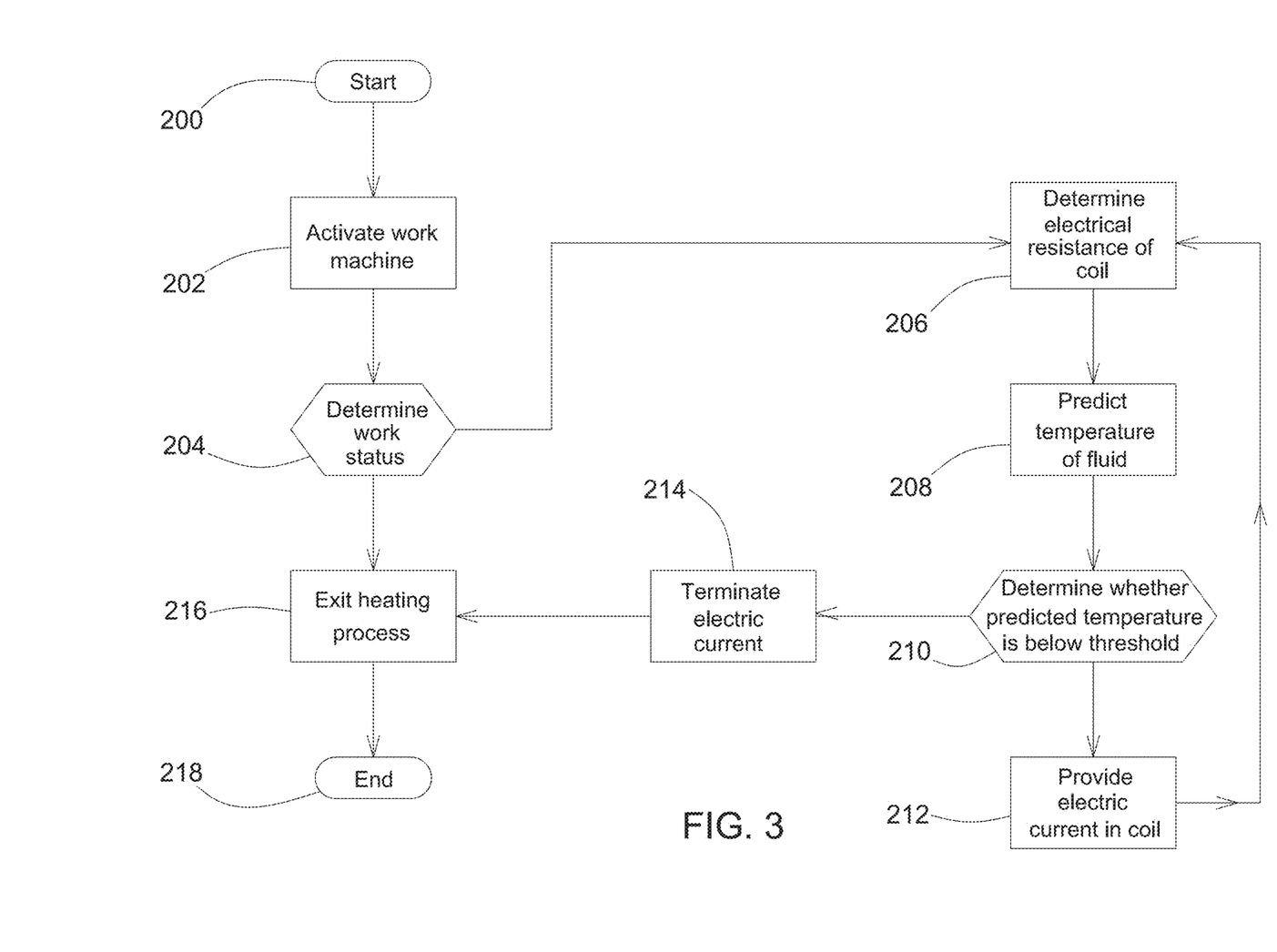
FIG. 3 is a flow diagram of a suspension system for a work vehicle, according to an implementation.

With reference to FIG. 3, a method of operating a suspension system 120 for a work vehicle 100 can be utilized in one or more of the implementations described herein and depicted in the various FIGURES. At step 200, the method starts.

At step 202, the work machine 100 starts up or is activated. The method continues to step 204.

At step 204, the controller 150 determines a work status (e.g., parked or operational) of the work vehicle 100. The controller 150 communicates with the one or more sensors of the sensor system 140. If the work status is parked, the method continues to step 206 with a warmup or heating process. If the work status is operational, the method continues to step 216.

At step 206, the controller 150 determines an electrical resistance of a coil 124 positioned at least partially or completely in a fluid located inside a shock absorber 122. The method continues to step 208.

At step 208, the controller 150 predicts the temperature of a fluid in the shock absorber 122 based on the electrical resistance of the coil 124. The controller 150 can access a local or remote database 160 to relate or associate the electrical resistance to a predicted temperature. The method continues to step 210.

At step 210, the controller 150 determines whether the predicted temperature is below a lower threshold. If the predicted temperature is below the lower threshold, the method continues to step 212. If the predicted temperature is at or above the lower threshold, the method continues to step 214.

At step 212, the controller 150 provides an electric current in the coil 124, which heats the fluid in the shock absorber 122. The method returns to step 206 to continue determining or monitoring the electrical resistance and predicting the temperature of the fluid during the warmup or heating process (e.g., while the electric current is on).

At step 214, the controller 150 terminates the electric current in the coil 124. The method continues to step 216.

At step 216, the work machine 100 exits the shock absorber warmup or heating process and enters a default suspension control. The controller 150 begins a default suspension control for the suspension system 120.

At step 218, method of operating a suspension system 120 for a work vehicle 100 is complete, according to one implementation. In other implementations, one or more of these steps, processes, or operations may be omitted, repeated, re-ordered, combined, or separated and are within the scope of the present disclosure.

Figure 4:
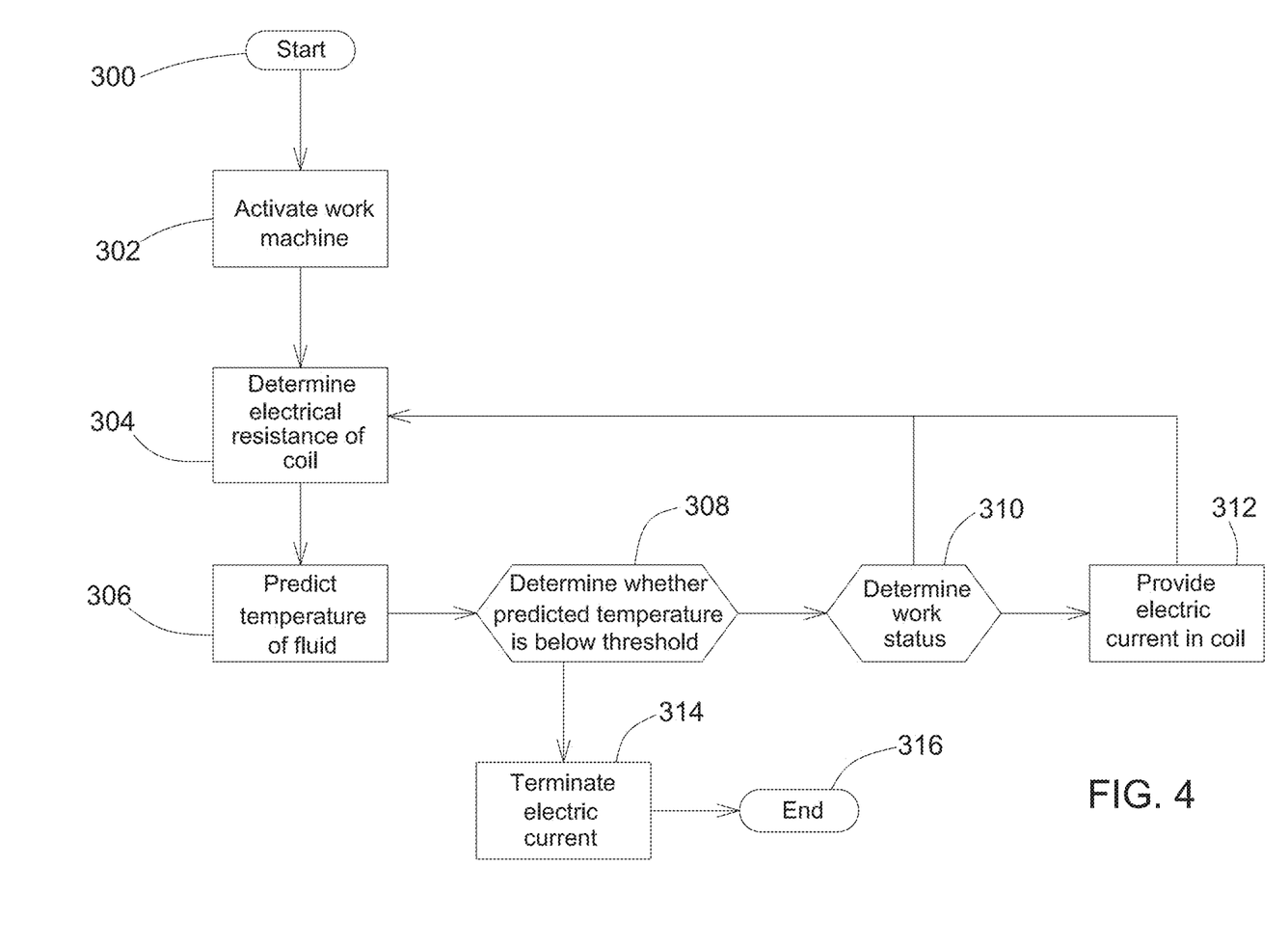
FIG. 4 is a flow diagram of a suspension system for a work vehicle, according to an implementation.

With reference to FIG. 4, another method of operating a suspension system 120 for a work vehicle 100 can be utilized in one or more of the implementations described herein and depicted in the various FIGURES. The method in FIG. 4 can be an alternative or an addition to the method in FIG. 3. At step 300, the method starts.

At step 302, the work machine 100 starts up or is activated. The method continues to step 304.

At step 304, the controller 150 determines an electrical resistance of a coil 124 positioned at least partially or completely in a fluid located inside a shock absorber 122. The method continues to step 306.

At step 306, the controller 150 predicts the temperature of a fluid in the shock absorber 122 based on the electrical resistance of the coil 124. The controller 150 accesses a local or remote database 160 to relate or associate the electrical resistance to a predicted temperature. The method continues to step 308.

At step 308, the controller 150 determines whether the predicted temperature is below a lower threshold. If the predicted temperature is below the lower threshold, the method continues to step 310. If the predicted temperature is at or above the lower threshold, the method continues to step 314.

At step 310, the controller 150 determines a work status (e.g., parked or operational) of the work vehicle 100. The controller 150 communicates with the one or more sensors of the sensor system 140. If the work status is parked, the method continues to step 312. If the work status is operational, the method returns to step 304 to continue determining or monitoring the electrical resistance and predicting the temperature of the fluid during the warmup or heating process.

At step 312, the controller 150 provides an electric current in the coil 124, which heats the fluid in the shock absorber 122. The method returns to step 304 to continue determining or monitoring the electrical resistance and predicting the temperature of the fluid while the electric current is on.

At step 314, the controller 150 terminates the electric current in the coil 124. The method continues to step 316.

At step 316, method of operating a suspension system 120 for a work vehicle 100 is complete, according to one implementation. In other implementations, one or more of these steps, processes, or operations may be omitted, repeated, re-ordered, combined, or separated and are within the scope of the present disclosure.

The terminology used herein is for the purpose of describing example embodiments or implementations and is not intended to be limiting of the disclosure. As used herein, the singular forms "a," "an," and "the" are intended to include the plural forms as well, unless the context clearly indicates otherwise. It will be further understood that the any use of the terms "has," "includes," "comprises," or the like, in this specification, identifies the presence of stated features, integers, steps, operations, elements, and/or components, but does not preclude the presence or addition of one or more other features, integers, steps, operations, elements, components, and/or groups thereof.

Those having ordinary skill in the art will recognize that terms such as "above," "below," "upward," "downward," "top," "bottom," etc., are used descriptively for the figures, and do not represent limitations on the scope of the present disclosure, as defined by the appended claims. Furthermore, the teachings may be described herein in terms of functional and/or logical block components or various processing steps, which may include any number of hardware, software, and/or firmware components configured to perform the specified functions.

Terms of degree, such as "generally," "substantially," or "approximately" are understood by those having ordinary skill in the art to refer to reasonable ranges outside of a given value or orientation, for example, general tolerances or positional relationships associated with manufacturing, assembly, and use of the described embodiments or implementations.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

While the above describes example embodiments or implementations of the present disclosure, these descriptions should not be viewed in a restrictive or limiting sense. Rather, there are several variations and modifications which may be made without departing from the scope of the appended claims.

What is claimed is:

1. A suspension system for a work vehicle, comprising:
   a shock absorber including a fluid;
   a coil positioned at least partially in the fluid;
   a sensor configured to detect a work status of the work vehicle; and
   a controller configured to determine the work status of parked or operational based on the sensor, determine an electrical resistance of the coil in a shock absorber based on the work status, predict a temperature of a fluid in the shock absorber based on the electrical resistance of the coil, provide an electric current in the coil based on the predicted temperature of the fluid, determine the electrical resistance of the coil while the electric current is on, and terminate the electric current in the coil based on the work status and the predicted temperature.

2. The suspension system of claim 1, wherein the controller is configured to determine the electrical resistance of the coil when the work status is parked.

3. The suspension system of claim 1, wherein the controller is configured to access a database to predict the temperature of the fluid.

4. The suspension system of claim 1, wherein the controller is configured to provide the electric current in the coil when the predicted temperature of the fluid is below a lower threshold.

5. The suspension system of claim 1, wherein the controller is configured to terminate the electric current in the coil when one of the predicted temperature of the fluid is at or above a lower threshold and the work status is operational.

6. The suspension system of claim 1, wherein the sensor is configured to detect a status of a transmission of the work vehicle.

7. The suspension system of claim 6, wherein the controller is configured to determine the work status is parked when the sensor detects the transmission is in park.

8. The suspension system of claim 6, wherein the controller is configured to determine the work status is operational when the sensor detects the transmission is in one of a forward gear and a reverse gear.

9. The suspension system of claim 1, wherein the controller is configured to provide information regarding the work status, the predicted temperature, and the electric current to one of an operator interface and a remote electronic device.

10. The suspension system of claim 1, wherein the controller is configured to continuously determine the electrical resistance of the coil and continuously predict the temperature of the fluid based on the electrical resistance of the coil.

11. A method of operating a suspension system for a work vehicle, comprising:
    detecting via a sensor a work status of the work vehicle;
    determining via a controller the work status of parked or operational;
    determining via the controller an electrical resistance of a coil positioned at least partially in a fluid located inside a shock absorber;
    predicting via the controller a temperature of a fluid in the shock absorber based on the electrical resistance of the coil;
    providing via the controller an electric current in the coil based on the work status and the predicted temperature of the fluid;
    determining via the controller the electrical resistance of the coil while the electric current is on; and
    terminating via the controller the electric current in the coil based on the work status and the predicted temperature.

12. The method of claim 11, wherein the controller determines the electrical resistance of the coil when the work status is parked.

13. The method of claim 11, wherein the controller accesses a database to predict the temperature of the fluid.

14. The method of claim 11, wherein the controller provides the electric current in the coil when the predicted temperature of the fluid is below a lower threshold.

15. The method of claim 11, wherein the controller terminates the electric current in the coil when one of the predicted temperature of the fluid is at or above the lower threshold and the work status is operational.

16. The method of claim 11, wherein the sensor detects a status of a transmission of the work vehicle.

17. The method of claim 16, wherein the controller determines the work status is parked when the sensor detects the transmission is in park.

18. The method of claim 16, wherein the controller determines the work status is operational when the sensor detects the transmission is in one of a forward gear and a reverse gear.

19. The method of claim 11, wherein the controller provides information regarding the work status, the predicted temperature, and the electric current to one of an operator interface and a remote electronic device.

20. The method of claim 11, wherein the controller continuously determines the electrical resistance of the coil and continuously predicts the temperature of the fluid based on the electrical resistance of the coil.

\* \* \* \* \*